United States Patent

Maher et al.

[11] Patent Number: 5,910,198
[45] Date of Patent: Jun. 8, 1999

[54] LUG NUT REMOVAL AND TIGHTENING TOOL

[76] Inventors: Daniel J. Maher; Billie Jo Maher, both of 1034 Lawrence Ct., Girard, Pa. 16417

[21] Appl. No.: 08/904,463

[22] Filed: Aug. 1, 1997

[51] Int. Cl.⁶ .................................................. B25B 23/00
[52] U.S. Cl. ............................................. 81/462; 81/180.1
[58] Field of Search ................................... 81/462, 177.2, 81/180.1; 248/352

[56] References Cited

U.S. PATENT DOCUMENTS

| | | | |
|---|---|---|---|
| 3,577,818 | 5/1971 | Cramer | 81/462 |
| 3,730,027 | 5/1973 | Rohn | 81/462 |
| 4,620,462 | 11/1986 | Parker | 81/462 |
| 4,625,600 | 12/1986 | Koren et al. | 81/462 |
| 5,263,392 | 11/1993 | Schoen | 81/462 |
| 5,613,411 | 3/1997 | Rines | 81/462 |

FOREIGN PATENT DOCUMENTS 1536907  12/1978  United Kingdom ..................... 81/462

*Primary Examiner*—D. S. Meislin
*Attorney, Agent, or Firm*—Melvin L. Crane, Agent

[57] ABSTRACT

A lug removal and tightening tool comprising a supporting base plate. A vertically supported upright which is supported by the base plate. The vertically supported upright includes a plurality of apertures in a circular pattern. A leverage bar which is removably secured to one end of a socket-type extension for loosening a lug nut by placing a socket end of the extension on a lug. The leverage end of the extension is supported in one of the apertures in order to support the leverage bar during loosening the lug. Each aperture of the movable plate aligns with a lug such that by moving the extension to different lugs, each of the lugs are loosened.

2 Claims, 4 Drawing Sheets

LUG NUT REMOVAL AND TIGHTENING TOOL

This invention is directed to a lug nut or lug bolt removal and tightening tool and more particularly to a lug nut or lug tightening tool which is simple in structure and which enables a small sized person to remove the lug nuts or bolts.

PRIOR ART

It is well-known that lug nuts or bolts can be removed and tightened by use of an automatic air driven tool.

Other devices have been used such as a hammer impact tool which loosens the lug nuts or bolts by use of a pounding force on a handle which is fitted onto the lug nut or lug bolt.

Most every automobile has a lug wrench in the vehicle which is provided for removing and tightening lug nuts or lug bolts of the vehicle. It is known that after a lug nut or lug bolt has been tightened by an air driven tool that the lug nuts or lug bolts are almost impossible to be removed by an ordinary person using the lug tool furnished with the vehicle. These lug tools are provided to fit the size of the lugs on that particular vehicle.

It is well-known that different makes and sizes of vehicles may have different sized lugs. Therefore, there has been provided a tool having crossed perpendicular arms. Each of the arms has a different sized end for matching different sized lugs. Therefore, the one lug wrench can be used for four different sized lugs. When the lugs are real tight, rusted or are without grease, they are almost impossible to remove by use of a lug wrench, even a cross arm one.

OBJECT AND ADVANTAGES

It is therefore an object of the invention to provide a lug nut tightening and removal tool which is simple in construction and which easily removes normally hard to remove lugs.

Another object is to provide a lug tool by which a small person can remove normally hard to remove lugs.

Other objects and advantages of the invention will become obvious from the drawings and the detailed description.

DETAILED DESCRIPTION OF THE INVENTION

Figure 1:
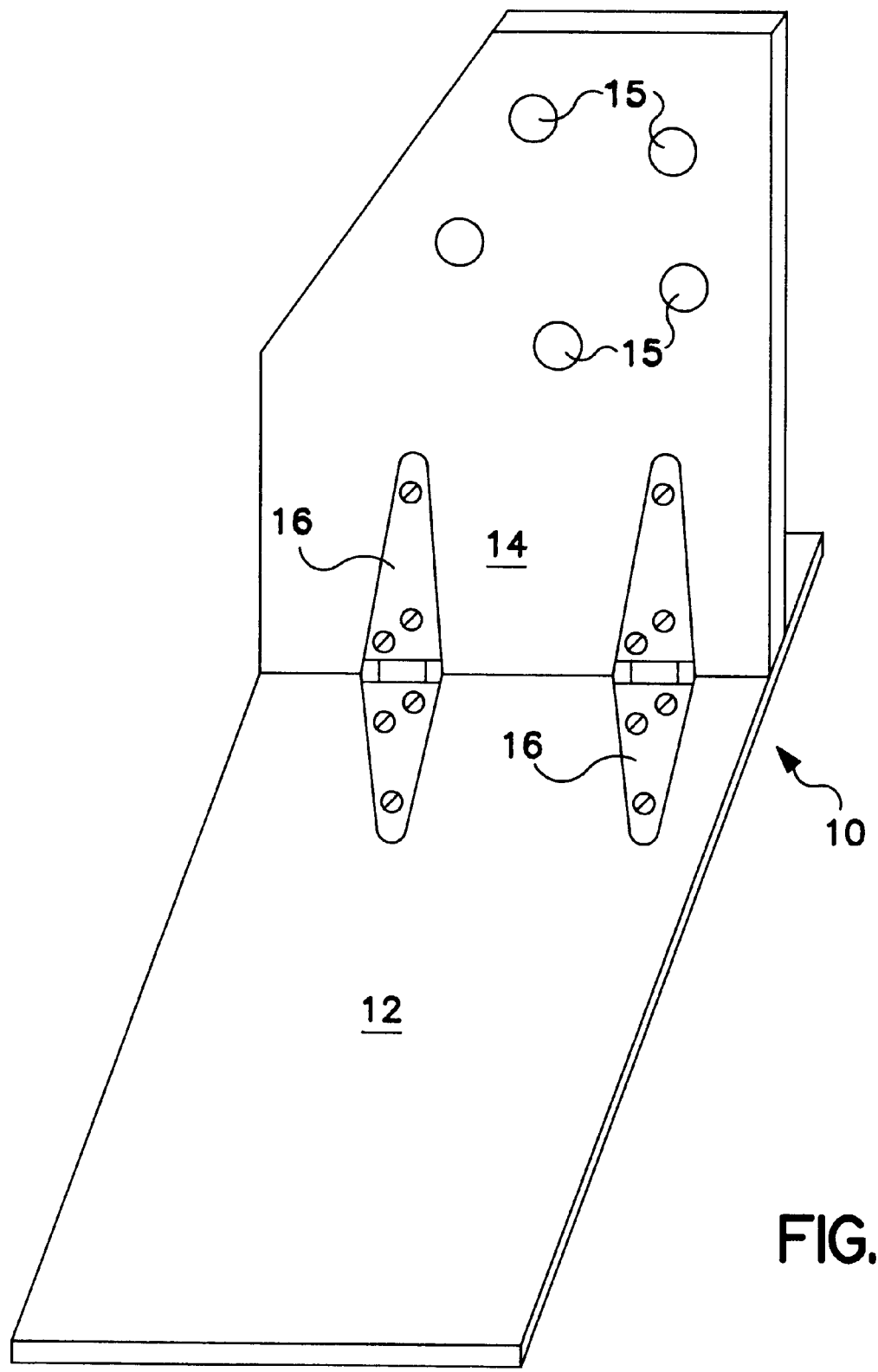
FIG. 1 is a perspective view of an upright supported fixture which functions as a fulcrum for a lug removal and tightening tool.

Now, referring to the drawings in which the same reference characters refer to the same part throughout the disclosure, there is shown in FIG. 1 a perspective view of the lug removal and tightening device 10. The device includes a supporting base plate 12 to which an upright vertically standing support plate 14 is secured by at least one hinge 16 or any other suitable means. The support plate need not be of the same width or thickness of the upright plate. As shown, the supporting base plate extends a short distance beyond the hinged connection so that the bottom end of the upright support plate seats onto the upper surface of the supporting base plate and is supported in a vertical position. The upright is hinged to the supporting base plate so that the upright can be folded downwardly along the upper surface of the supporting base plate in order to use less storage space. The upright is provided with a pattern of apertures 15 formed in a circular pattern about a center axis. The pattern of apertures are centered such that the circular pattern would be aligned with a pattern of lugs on a vehicle that secures the wheel in place. It is well-known that different sized and/or makes of vehicles have a specifically designed circle of lugs. Therefore, the upright support plate should have a pattern of circular apertures that fit a specific vehicle. The pattern shown is for the popular 3¾ inch lug pattern. The upright support plate could be held in an upright vertical position by any suitable means secured to one side of the upright and the upper surface of the supporting base plate.

In order to use the same supporting base plate for different supporting upright plates with different sized aperture patterns, instead of the at least one hinge, the supporting base plate could have at least one U-shaped linear part secured to the upper surface of the supporting base plate. The at least one U-shaped part would have a spacing between the arms of the U-Shape which is the same as the thickness of the upright supporting plate. Thus, an upright supporting plate with the proper pattern of lugs could be slid into the at least one U-shaped part to support the supporting upright plate in an upright position. With such a tool one could purchase one supporting base plate with any number of vertical supporting upright plates with different aperture patterns. Such an arrangement would be suitable for a tire repair shop which could have different sized wheels that have different sized lug patterns.

Figure 2:
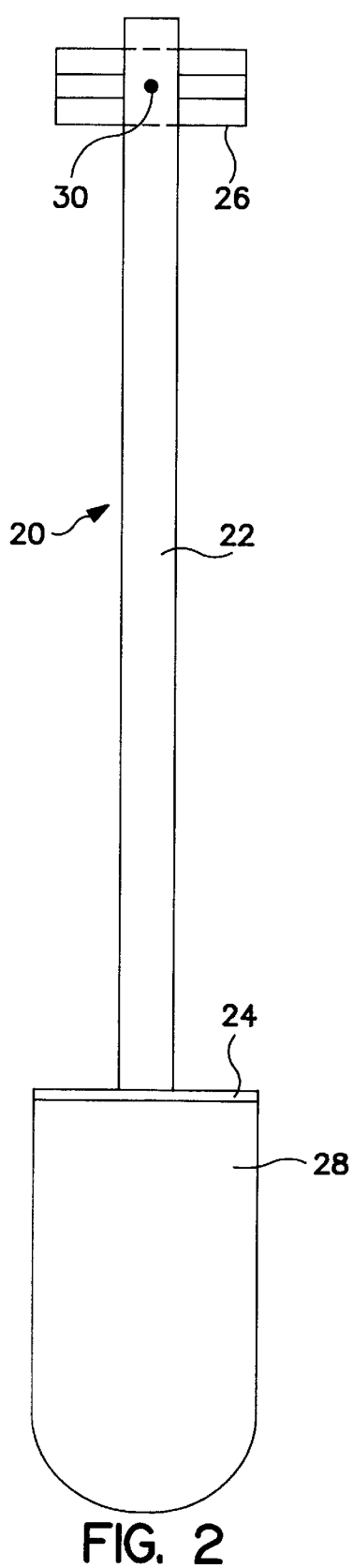
FIG. 2 illustrates a top view of a leverage bar or arm used to remove or tighten a lug.
Figure 3:
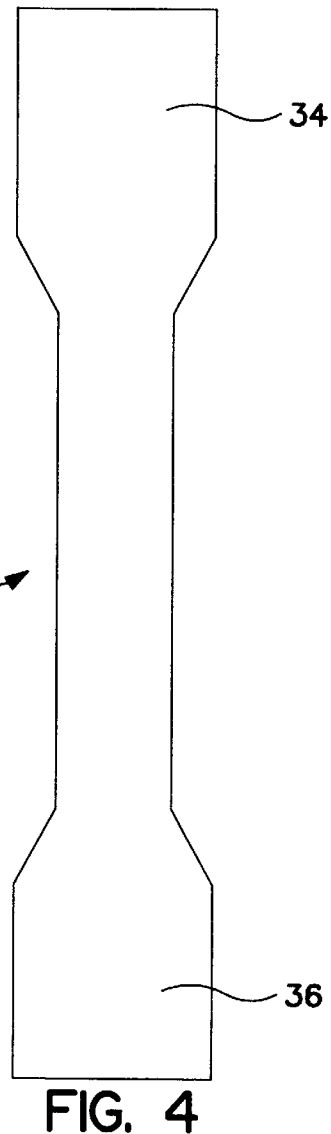
FIG. 3 illustrates a side view of the leverage bar or arm.
Figure 4:
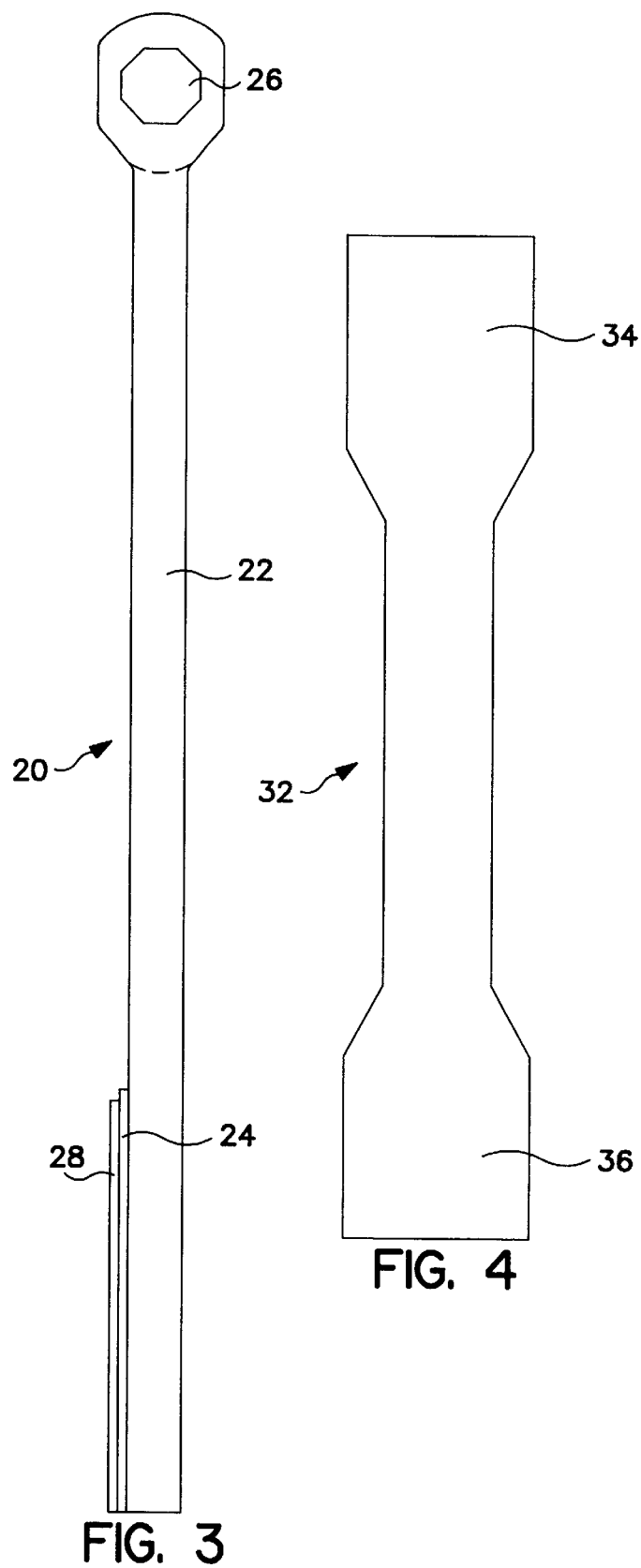
FIG. 4 illustrates a socket-type extension which includes a socket end that fits onto a lug and a drive end onto which the leverage bar or arm is fitted in order to remove or tighten a lug.

In order to use the supporting structure to remove the lugs from a wheel, there is required some type of tools. FIGS. 2–4 illustrate a top view of a leverage lever 20, a side view of the leverage lever and an extension 22 which are used with the vertical upright support and supporting base place in order to remove a wheel from a vehicle.

The leverage lever 20 shown in FIGS. 2 and 3 is formed by an elongated metal bar 22 which has any suitable length for producing a good leverage. As is well-known, the longer the bar the greater the force that can be applied. The leverage bar is provided with a foot pad 24 on one end and a fixed drive means 26 secured to the opposite end of the bar. The foot pad should be provided with a non-slip pad 28 so that in use the users foot will not slip off of the foot pad. The drive means can be hexagonal shaped, square or any suitable shape. The drive is positioned within an aperture in the metal bar and is held in place by a set screw 30. The drive 26 extends outwardly from each side of the metal bar. This is because the different drives are used for opposite sides of the vehicle when removing the lugs. Also, the different ends of the drive would be used for tightening the lugs.

In order to position the supporting device close to a wheel to remove the lugs a socket-type extension 32 is provided. One end of the extension is provided with a hexagon socket 34 having a size to fit a lug of the vehicle to be serviced and the opposite end 36 is provided with a socket of a size and shape to match the drive 26 on the leverage bar.

In describing the vertical supporting upright plate, the circular pattern for the apertures in the plate was mentioned. These apertures should have an aperture size so that the end 36 of the extension 32 fits with a loose fit in the aperture.

Figure 5:
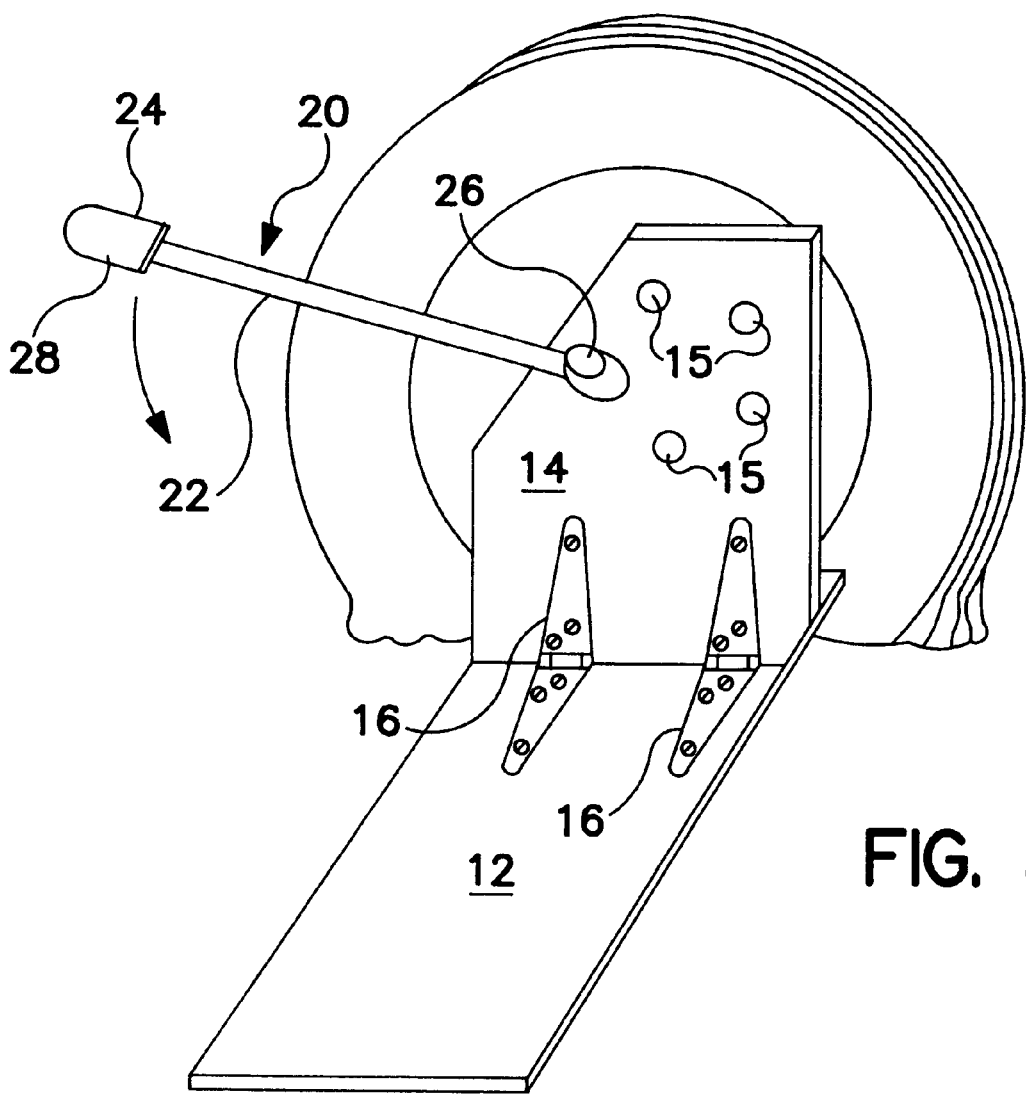
FIG. 5 is a perspective view of the device which illustrates the lug tool in use to remove a wheel which has a flat tire.
Figure 6:
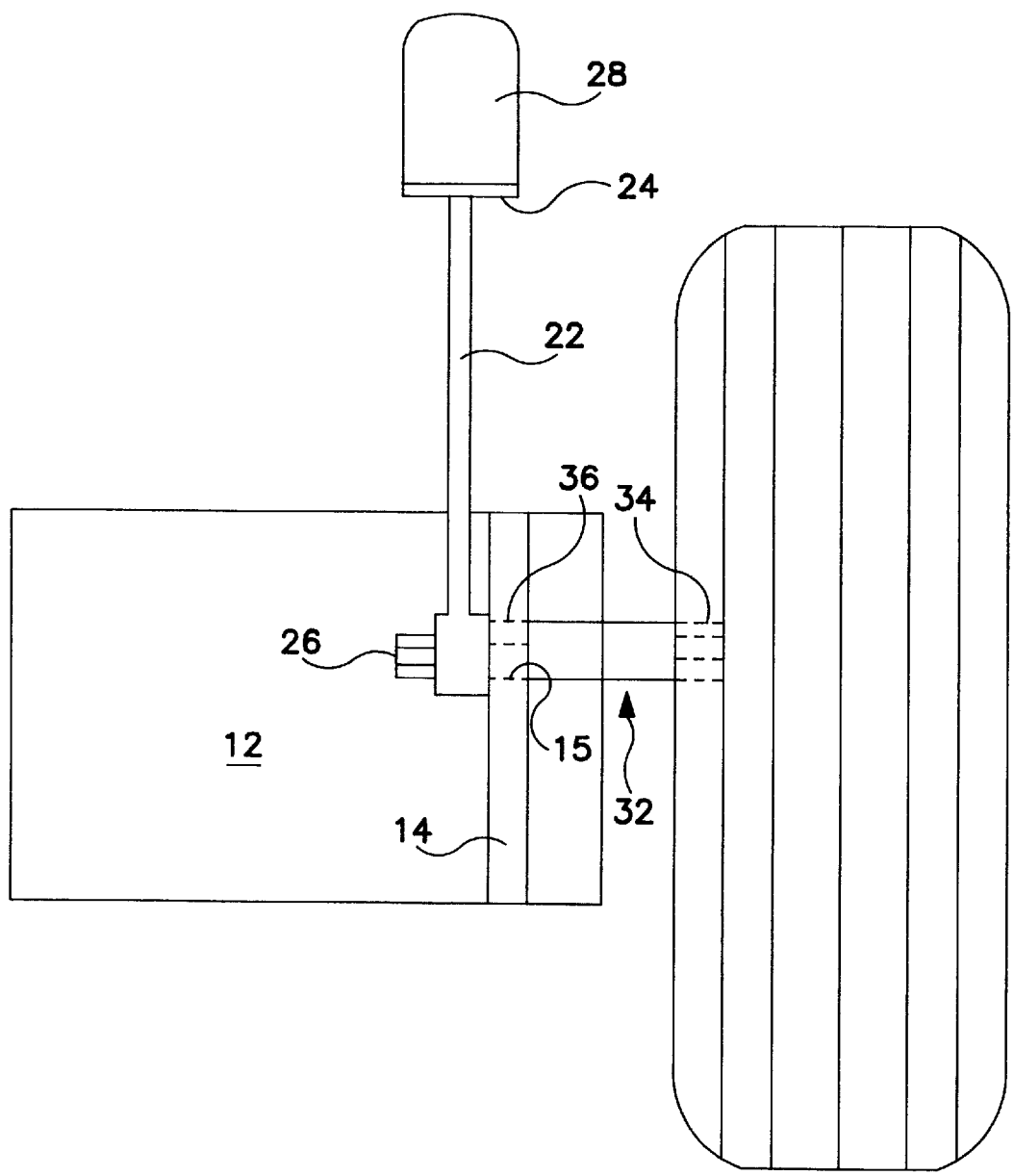
FIG. 6 is a top view of the lug tool looking downwardly from above a wheel.

FIG. 5 illustrates a perspective view of the lug nut removal and tightening tool positioned adjacent a wheel in a position for removing the lugs from the wheel. In operation, the supporting base plate is moved with the short end close to the tire. The vertical support base is moved upwardly to a vertical position and locked in place if a lock is available. The extension 32 is slid with the lug end onto a lug, then the drive end 36 is positioned in the aligned aperture in the vertical plate. Once the extension is in place on the lug and in the aperture in the vertical plate, the leverage bar is secured with the drive fitted into the drive end of the extension. The foot pad end of the leverage bar should be raised substantially parallel with the ground surface. The operator steps onto the foot pad to apply a downward force onto the lug. Of course, the leverage bar must be on the side of the extension such that the lug can be removed. It is known that some vehicles have left-hand screw threaded lugs. Therefore, one cannot say for sure in the explanation whether the leverage bar should be to the front of the vehicle or to the back of the vehicle. For right-hand threaded lugs, the leverage bar would be to the front on the left side facing front, and would be toward the back on the opposite side. In removing the lugs, the vertical supporting plate functions as a fulcrum so that the lugs are easily removed.

In use of the lug nut removal tool, leverage and the operator's body weight cooperate to loosen the lug nuts or bolts by means of stepping on the foot pad so that the socket assembly supported by the vertical supporting plate will remove the lug nut or bolt. In order to remove each of the lug nuts or bolts once one has been removed, the others are moved with the same procedure. It would be obvious that if the apertures were too low to match with the lug that the wheel could be jacked up slightly to match the aperture. Further, if the tool stand is not high enough, something can be placed under the supporting base plate to raise the supporting base plate and consequently raise the vertical support plate. In this manner, a lug removal tool made for one vehicle could be used with a different vehicle that did not match with the aperture pattern available.

It would be obvious to one skilled in the art that the supporting base plate and vertical support plate can be made for any suitable material including metal such as steel or aluminum, thermoset plastic, plexiglass or wood of a suitable type and thickness. The invention is not bound by any particular type of material only that it suffices to serve the purpose intended.

In carrying on the invention, the following dimensions have been determined to be satisfactory. The supporting base plate has a width of 8 inches and a length of 13¾ inches. The vertical upright has a length of about 10¾ inches with a width of 8 inches. In using certain types of wood or plastic, the thickness of the base plate and vertical upright should be from ⅝ inch to ¾ inch. The use of metal could have a lesser thickness but should be at least 3/16 inch thick. The vertical upright is secured about 2 inches from the end of the base. The length of the leverage bar is about 18 inches with a width of ¾ inch with a 9/16 inch hexagonal drive. The socket extension should be about 6 inches in length with a drive end that fits in the aperture in the vertical support plate. The opposite end of the extension should be of a size to fit onto the lug nut or bolt properly.

Applicants have determined that a person that weighs only about 45 pounds can remove lugs that have been fitted tightly onto a vehicle with an air drive mechanism.

The device of this invention is useful in removing tight or over tightened lugs from an automobile wheel such as when one has a flat tire. Of course, it can be used at other times for some other purpose, such as rotating the wheels. It would be obvious that if a tire is inflated that the supporting base plate should be raised in order to compensate for the additional height of the lug nuts. Also, in use, if the apertures on the lug nut removal device do not line up, the vehicle can be moved ahead or backed up a little so that the lug will line up with the apertures.

The foregoing relates to preferred exemplary embodiments of the invention, it being understood that other variants and embodiments thereof are possible within the spirit and scope of the invention, the latter being defined by the appended claims.

What is claimed is:

1. A lug nut removal and tightening device which comprises:

a linear supporting base plate, a movable plate secured to an upper surface of said supporting base plate near one end thereof and adapted to be moved to a vertical upright position, a two-piece hinge, one piece of said hinge being secured to an upper surface of said supporting base plate, another piece of said hinge secured to one surface of said movable plate near an end thereof for movement of said movable plate from a horizontal position substantially parallel with said upper surface of said supporting base plate to a vertical position substantially perpendicular with said supporting base plate, said movable plate including a plurality of apertures of a same size arranged in a circular pattern for alignment with different lug nuts on an automobile wheel, a linear leverage bar including a drive means on a drive end thereof, a linear socket-type extension, said linear socket-type extension having a socket end that fits the lug nuts on said vehicle and a drive end for receiving said drive means on one end of said leverage bar, said drive end of said socket-type extension having a diameter which fits within one each of said apertures in said movable plate, is rotatable within said aperture and supported by said moveable plate, said drive means on the drive end of said leverage bar is inserted into said drive end of said socket-type extension on a side of said support means opposite from said wheel and said leverage bar is rotated in a vertical plane to rotate said socket-type extension to loosen or tighten said lug nut.

2. A lug nut removal and tightening device as set forth in claim 1, which includes a foot pad on one end of said leverage bar.

* * * * *